(12) United States Patent
Foerth et al.

(10) Patent No.: US 10,391,869 B2
(45) Date of Patent: Aug. 27, 2019

(54) ENERGY CONVERSION DEVICE FOR AN ELECTRICALLY DRIVEN VEHICLE

(71) Applicant: SIEMENS MOBILITY GMBH, Munich (DE)

(72) Inventors: Christian Foerth, Erlangen (DE); Stefan Hassler, Kirchenthumbach (DE); Stefan Koch, Gerhardshofen (DE); Sabine Methner, Erlangen (DE); Gerhild Schinagl, Stattegg (AT); Thorsten Stuetzle, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/772,191

(22) PCT Filed: Oct. 28, 2016

(86) PCT No.: PCT/EP2016/076028
§ 371 (c)(1),
(2) Date: Apr. 30, 2018

(87) PCT Pub. No.: WO2017/072274
PCT Pub. Date: May 4, 2017

(65) Prior Publication Data
US 2018/0312067 A1    Nov. 1, 2018

(30) Foreign Application Priority Data
Oct. 30, 2015    (DE) .......................... 10 2015 221 266

(51) Int. Cl.
*B60L 7/08*    (2006.01)
*B60L 7/22*    (2006.01)

(52) U.S. Cl.
CPC ...... *B60L 7/22* (2013.01); *B60L 7/08* (2013.01); *B60L 2240/12* (2013.01)

(58) Field of Classification Search
CPC ........................................................ B60L 7/22
(Continued)

(56) References Cited

U.S. PATENT DOCUMENTS

| 4,093,900 A | 6/1978 | Plunkett |
| 7,368,889 B2 * | 5/2008 | Youm ...................... H02P 3/22 |
| | | 318/375 |

(Continued)

FOREIGN PATENT DOCUMENTS

| DE | 102013207952 A1 | 10/2014 |
| EP | 2578436 A1 | 4/2013 |

(Continued)

*Primary Examiner* — David Luo
(74) *Attorney, Agent, or Firm* — Laurence Greenberg; Werner Stemer; Ralph Locher

(57) ABSTRACT

An energy conversion device for a vehicle is particularly suited for a rail vehicle. The energy conversion device has, in at least one mode, a unit which operates as a generator unit and has at least one synchronous machine, and which has at least one energy discharge unit which is provided for discharging at least a portion of an electrical energy generated by the generator unit, and has at least one resistor unit. The novel energy discharge unit has at least one control unit which is provided to set operating modes from a set of operating modes in which the resistor unit makes available a different resistance value in each case.

18 Claims, 4 Drawing Sheets

(58) Field of Classification Search
USPC .......................................... 318/376, 375, 362
See application file for complete search history.

(56) References Cited

U.S. PATENT DOCUMENTS

| | | | |
|---|---|---|---|
| 7,940,016 B2 * | 5/2011 | Donnelly | B60L 7/04 318/139 |
| 8,907,599 B2 * | 12/2014 | Koral | H02P 3/16 188/24.14 |
| 2003/0233959 A1 | 12/2003 | Kumar | |
| 2006/0005738 A1 | 1/2006 | Kumar | |
| 2011/0156621 A1 | 6/2011 | Schaefer-Enkeler | |
| 2012/0286707 A1 | 11/2012 | Liberatore et al. | |
| 2016/0075350 A1 | 3/2016 | Becker et al. | |

FOREIGN PATENT DOCUMENTS

| | | |
|---|---|---|
| RU | 52783 U1 | 4/2006 |
| RU | 2302951 C1 | 7/2007 |
| RU | 2497696 C2 | 11/2013 |

\* cited by examiner

ENERGY CONVERSION DEVICE FOR AN ELECTRICALLY DRIVEN VEHICLE

BACKGROUND OF THE INVENTION

Field of the Invention

The invention relates to an energy conversion device for a vehicle, in particular a rail vehicle, which has in at least one mode a unit operating as a generator unit and having at least one synchronous machine, and which has at least one energy diverting unit that is provided for the purpose of diverting at least some of the electrical energy generated by the generator unit, and at least one resistor unit.

Vehicles are already known that have drive motors having the function of an electrical generator in a braking mode. The energy generated in the braking mode may be stored, or fed back to an electrical supply network. Where there is insufficient capacity for storage and/or feeding back, it has already been proposed that at least some of the electrical energy generated should be diverted to a resistor unit.

DE 101 60 612 A1 discloses a traction drive having a traction converter and a permanently excited synchronous machine. A braking moment can be generated in a synchronous machine, also designated a synchronous motor, in a simple manner in that the terminals of the synchronous machine are connected to resistors. The specification describes switching over to a group of resistors in order to brake the vehicle safely, wherein the braking moment is selected by way of the parameters of the machine and the resistance value and the speed of rotation.

The object of the invention is to improve the diversion of energy to the resistor unit.

BRIEF SUMMARY OF THE INVENTION

For this purpose, it is proposed that the energy diverting unit should have at least one control unit that is provided for the purpose of selecting operating modes from a plurality of operating modes, in each of which the resistor unit provides a different resistance value. As a result, an advantageous flexibility can be achieved in respect of a braking moment to be generated and/or a braking performance of the vehicle to be generated. In particular, for these variables it is advantageously possible to combine a number of characteristic curve sections of different characteristic curves, which are each associated with a resistance value, with one another in order to provide an optimized braking procedure, by activating operating modes from the plurality one after the other. The control unit is in particular provided for successively selecting operating modes from the plurality of operating modes. An order in which the operating modes are activated one after the other may be established in advance. This order may in particular be determined by a sequence of falling or rising resistance values.

The unit that operates as a generator unit may in particular include at least one electric motor in the form of a synchronous machine, wherein this electric motor is provided in a first mode—also called the drive mode—for generating a torque, that is to say for converting electrical energy into mechanical energy, and in a second mode—also called the braking mode—generates a braking moment and in so doing, acting as a generator, converts mechanical energy into electrical energy.

Here, permanently excited synchronous machines have the advantage that they generate a voltage as soon as they start rotating. This voltage can be converted to current by way of resistors and can accordingly be converted into a braking moment.

The term "resistor unit" should be understood to mean a unit that is provided for the purpose of establishing an electrical resistance in the flow of the electrical energy to be diverted. It serves in particular to convert the electrical energy passing through it into thermal energy.

The energy conversion device is suitable for a vehicle, in particular a rail vehicle, in which at least in a braking mode at least some of the electrical energy generated by the generator unit—as well as being diverted to the energy diverting unit—can be fed to an energy absorbing unit. An energy absorbing unit of this kind may in particular be formed by a power supply to which the vehicle is connected up, an energy storage unit and/or an internal energy supply of the vehicle that is provided for supplying electrical consumers—in the case of rail vehicles in particular, also called auxiliaries. The energy conversion device may in this case advantageously serve to support the energy absorbing unit, for example if the absorption capacity of the latter is restricted and/or insufficient.

If the vehicle is equipped with a mechanical braking unit, in particular a friction brake, that is provided in a braking mode for reducing a speed of rotation of the generator, then the energy conversion device advantageously serves to generate a desired braking moment in at least one speed range and in cooperation with the braking unit.

The control unit brings about a switchover between two operating modes of the plurality of operating modes, in particular in dependence on a detected parameter.

In a preferred embodiment of the invention, it is proposed that the energy conversion device should have a detecting unit for detecting at least one kinematic parameter of the vehicle, wherein the control unit is provided for the purpose of selecting operating modes from the plurality of operating modes in dependence on the detected kinematic parameter. As a result, it is possible to optimize the energy diversion very largely automatically and in manner adapted to a current operating situation—in particular to a current value of the kinematic parameter. The kinematic parameter may in particular be a linear velocity, a speed of rotation and/or a parameter that is representative of at least one of these parameters, such as a voltage parameter or a current parameter. The control unit brings about a transition from a first operating mode to a second operating mode of the plurality of operating modes or vice versa, preferably when the kinematic parameter or a variable determined therefrom reaches—that is to say exceeds or falls below—a predetermined threshold value.

The proposed energy conversion device is used in particular in a braking mode of the vehicle, wherein the generator unit is formed by at least one electrical traction motor of the vehicle taking the form of a synchronous machine. Here, the resistor unit in particular corresponds to a braking resistor unit.

As a result of suitably controlling the resistor unit, the braking properties of the vehicle can advantageously be improved. In particular, by varying the resistance value it is possible to select an optimized characteristic curve for the braking effect, in particular for a braking moment and/or braking performance, such that a high degree of efficiency can be achieved in braking of the vehicle for a broad spectrum of operational situations, in particular starting from high speeds.

The energy conversion device may advantageously and in at least one range of velocities generate a braking moment in cooperation with a mechanical braking unit, in particular a friction brake of the vehicle.

The mechanical energy to be converted by the energy conversion device in the braking mode is the kinetic energy, and where appropriate additionally a potential energy, of the vehicle. Using the proposed measure, it is possible to achieve a high degree of safety in operation of a rail vehicle that is intended for high speeds. The term "high speed" here should be understood to mean in particular a velocity of at least 300 km/h, preferably at least 350 km/h. Using the measure according to the invention, it is possible to perform braking procedures starting from high speeds of this kind safely in relation to conventional solutions.

A simple control of the resistor unit that is optimized in respect of the vehicle velocity may be achieved if the kinematic parameter is representative of the vehicle velocity. As a result of the proposed measure, a braking effect that is optimized for the high-speed range can be almost maintained in a medium-speed range as well. Here, a first operating mode of the plurality is in particular associated with the high-speed range, while a second operating mode of the plurality is in particular associated with the medium-speed range.

Here, a "high-speed range" corresponds in particular to a range of velocities between approximately 50% and 100% of the maximum velocity—in the case of a rail vehicle intended for high velocities, for example the range between approximately 175 km/h and the maximum velocity, for example 350 km/h—and a "medium-speed range" corresponds in particular to a range between approximately 10% and approximately 50% of the maximum velocity—in the case of the said rail vehicle the range between approximately 40 km/h and approximately 175 km/h. The spectrum of velocities is divided into the high-speed range and the medium-speed range in particular by defining a velocity threshold value, which is preferably in a range approximately 10% above and below half the maximum velocity. The term "maximum velocity" should in particular be understood to mean the maximum permitted velocity in a passenger operation.

By switching from a first operating mode that is optimized for the high-speed range to a second operating mode that is optimized for the medium-speed range, it is possible to combine advantageous characteristic curve sections that apply to these velocity ranges.

In this context, it is possible to obtain an advantageous characteristic curve for a braking moment of the vehicle if the control unit is provided for the purpose of switching over from a first operating mode of the plurality of operating modes to a second operating mode of the plurality in the event of a transition from a high-speed range to a medium-speed range, for the purpose of reducing the resistance value. If the plurality has two operating modes, then the resistance value in the second operating mode is particularly advantageously at least 40% and at most 60% of the resistance value in the first operating mode.

Preferably, the resistance value in the second operating mode has a value in a range from 5% below and above half the resistance value in the first operating mode.

It is furthermore proposed that the resistor unit should be arranged in a power supply unit that, in a drive mode of the vehicle, supplies electrical power to the unit that operates as a generator unit in a braking mode. As a result, a structurally simple embodiment that takes up little space can be achieved.

The energy conversion device advantageously has at least one current converter unit that, in the installed condition of the energy conversion device, is connected to provide power between the generator unit and the resistor unit. A current that is generated in the operating modes by the generator unit and is diverted to the resistor unit is thus carried by the current converter unit. In a braking mode, the current converter unit typically has the function of a rectifier, which rectifies a current generated by the generator unit. The rectified signal may in particular be fed to a so-called DC link.

In this context, it is possible to obtain a structurally simple embodiment if the resistor unit is connected up to a DC link that may be fed from the current converter unit. Here, the resistor unit is favorably connected in the DC link, in particular between the positive and the negative DC link busbar.

As an alternative or in addition, it is proposed that the energy conversion device should have at least one control device that controls the current converter unit such that operation thereof in the operating modes of the plurality of operating modes includes at least one blocking of switching valves of the current converter unit. This allows current to be carried through the current converter unit efficiently and with low loss. In particular, the current is guided via freewheeling diodes that are each connected in parallel with a switching valve. In this configuration, from a functional point of view the current converter unit takes the form of a diode bridge. The term "blocking" of a switching valve should be understood in particular to mean putting the latter into a non-conductive condition for a period of time that is longer than the duration of a switching cycle of the current converter unit. Here, the period of time preferably corresponds at least to the time during which an operating mode from the plurality of operating modes is being performed.

For the purpose of varying the resistance value of the resistor unit, the latter may have at least one variable and controllable resistance value. For the purpose of obtaining a structurally simple embodiment of the energy diverting unit, however, it is proposed that the resistor unit should have a set of resistance arrangements and a switching device that is in operative connection with at least one of the resistance arrangements, wherein a switchover between operating modes of the plurality of operating modes includes at least one actuation of the switching device. Favorably, the at least one control unit is in operative connection with the switching device for the purpose of actuating the latter. The resistance arrangements in particular take the form of ohmic resistors.

The proposed embodiment of the energy diverting unit is based on the use of a simple switching topology that is inexpensive to implement and simple to control. This is particularly advantageous since in this topology it is simpler to prove safe control, which is required for the purposes of approval of the vehicle, than it is for example with a special converter control.

For switching over between two operating modes of the plurality of operating modes, the switching device may change the number of active resistance arrangements and/or a switching topology of already active resistance arrangements, for example by converting a parallel circuit to a series circuit or vice versa.

If the switching device is in operative connection with all the resistance arrangements, then it can deactivate all the resistance arrangements in a work mode that is different from the operating modes of the plurality of operating modes, in particular in a drive mode. When an operating mode is selected from the plurality of operating modes, it then activates at least one of the resistance arrangements.

In a simple embodiment of the invention, it is proposed that, using the switching device and when selecting an operating mode from the plurality of operating modes, the control unit should be provided for the purpose of activating a parallel circuit of resistance arrangements of the set. Here, it is possible on the transition to this operating mode to achieve a simple reduction in the resistance value of the resistor unit. Here, it is possible for example for the resistance value to be halved in a particularly simple manner if resistance arrangements that are to be switched in parallel have an identical or almost identical resistance value and, starting from a configuration in a first operating mode with one active resistance arrangement, a parallel circuit of the resistance arrangements is activated in a second operating mode.

The terms "active" resistance arrangement and "active" circuit should be understood to mean a resistance arrangement or circuit that is connected up to an electrical circuit such that it contributes to the effect of the energy diverting unit. In other words, an active resistance arrangement or active circuit is in a condition in which at least some of the current generated by the generator unit flows through the resistance arrangement or circuit. The term "activate" should be understood to mean putting the resistance arrangement into the active condition.

In an advantageous development of the invention, it is proposed that the control unit should be provided for the purpose of activating a first and a second resistance arrangement alternately, in at least one operating mode of the plurality of operating modes, using the switching device, as a result of which a thermal load on the resistance arrangements may advantageously be lessened.

Moreover, the invention takes as its starting point a method for converting electrical energy that is generated in at least one mode, by a unit that has at least one synchronous machine and operates as a generator unit, in which at least some of the electrical energy generated by the generator unit is diverted via an energy diverting unit, and the energy diverting unit has at least one resistor unit.

It is proposed that, starting from a first operating mode, in which the resistor unit provides a first resistance value, there should be a switchover to a second operating mode, in which the resistor unit provides a second, different resistance value. The first and the second operating modes are advantageously from a plurality of operating modes, wherein a control unit is provided for selecting operating modes from the plurality of operating modes.

The reader is referred to the statements on the energy conversion device according to the invention for the advantageous effects of the proposed method.

BRIEF DESCRIPTION OF THE SEVERAL VIEWS OF THE DRAWING

An exemplary embodiment of the invention will be explained. In the figures.

DESCRIPTION OF THE INVENTION

Figure 1:
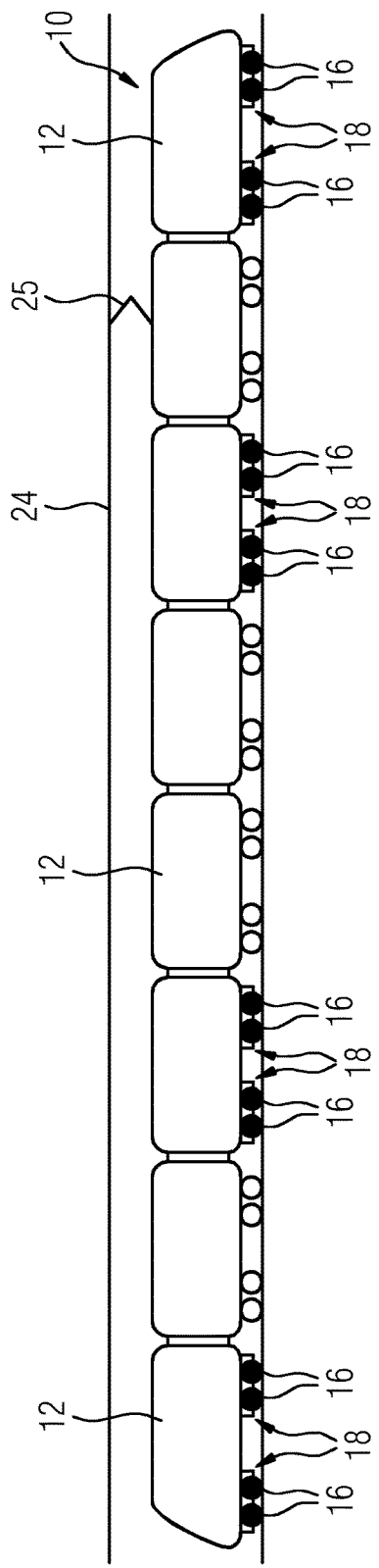
FIG. 1 shows a rail vehicle having multiple units in a side view.

FIG. 1 shows an exemplary rail vehicle 10 in a schematic side view. It takes the form of a trainset of cars 12, each of which is equipped for the transport of passengers. For this purpose, the cars 12 have at least one passenger compartment, which is provided for accommodating passengers. At least one of the cars 12 takes the form of a multiple unit that is supported on at least one drive axle 16 that may be driven by a drive unit 14 (see FIG. 2). In the configuration shown here, the rail vehicle 10 has at least four multiple units that are each supported on at least two, in particular four, drive axles 16. The multiple units are supported on the drive axles 16 by two motor bogies 18, wherein in each case two drive axles 16 are mounted on each motor bogie 18. Associated with the drive axles 16 of a motor bogie 18 in each case is a drive unit 14, illustrated in more detail in FIG. 2. This has two permanently excited synchronous machines as the traction motors 20, each of which is connected to a different drive axle 16 for driving. For the purpose of supplying the traction motors 16 of a motor bogie 18 with electrical power, the respective drive unit 14 has a power supply unit 22. This is illustrated in more detail in FIG. 2.

The rail vehicle 10 takes the form of an electrical vehicle that draws its operating energy from an external power supply 24. For this purpose, it is known to have a current collector 25, which picks up the high voltage provided by the power supply 24. This high voltage may be an alternating voltage and have typical voltage values 15 kV 16 Hz ⅔ or 25 kV 50 Hz. As an alternative, the high voltage may be a DC voltage and have in particular typical values 1.5 kV or 3 kV. The rail vehicle 10 is in particular provided for operation with an alternating voltage, although it may be suitable for both operation with an alternating voltage and also operation with a DC voltage.

Figure 2:
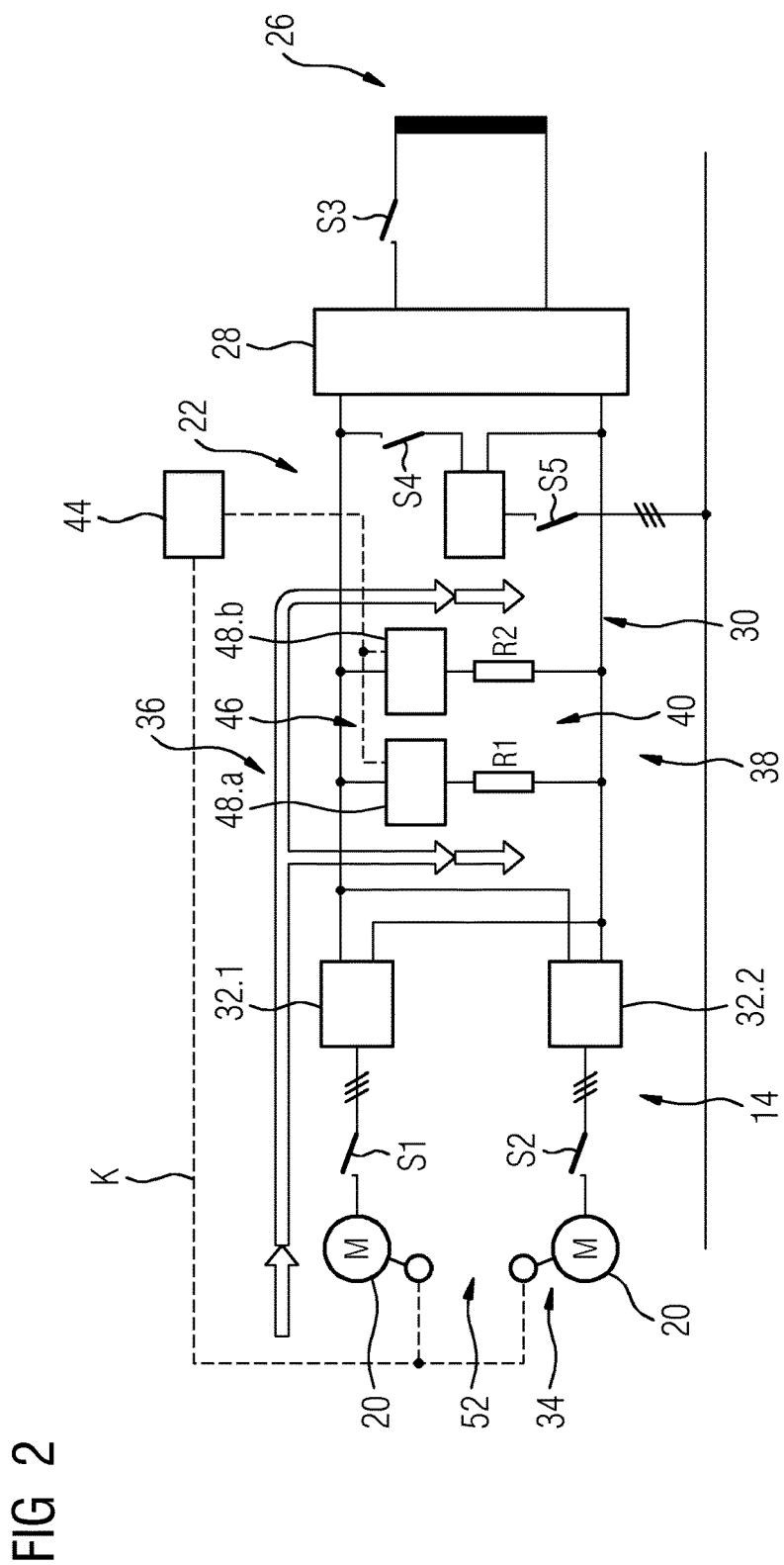
FIG. 2 shows a drive unit of a multiple unit, having a power supply unit.

In an alternating voltage operation, the high voltage provided by the power supply 24 is stepped down by a transformer unit 26. As can be seen in FIG. 2, this may take the form of a classic transformer or a current converter unit—in particular a so-called direct converter. The output from the transformer unit 26 shown in FIG. 2 is connected to provide power to the power supply units 22.

The rail vehicle 10 moreover has a braking device, not shown in more detail, that includes electrically and pneumatically controllable friction brakes.

FIG. 2 shows a circuit topology of one of the drive units 14. As described above, it has the traction motors 20 of the corresponding motor bogie 18 and the power supply unit 22 associated therewith. The power input to the power supply unit 22 is fed, in an alternating voltage operation, with the output signal from the transformer unit 26. The power supply unit 22 has a first current converter unit 28 on the input side, and this rectifies this output signal—in the case of an energy flow carried from the transformer unit 22 toward the traction motors 20, in particular in a traction mode. In the traction mode, the first current converter unit 28 accordingly performs the function of a rectifier. The first current converter unit 28 is in particular formed by an H bridge.

The power supply unit 22 moreover includes a DC link 30 that, during operation, carries a DC voltage signal. In the traction mode, the DC link 30 is fed with the signal that was rectified by the first current converter unit 28.

Further, the power supply unit 22 has two current converter units 32.1, 32.2 that are arranged on the motor side and are each associated with one of the traction motors 20. In the traction mode, the current converter units 32.1, 32.2 each perform the function of an inverter, which generates an alternating current from a direct current carried in the DC link 30. In particular, they each take the form of a pulsed-control inverter.

In a DC voltage mode, the DC voltage signal from the power supply may be fed directly to the DC link 30 or may be transformed using the current converter unit 28, which operates as a voltage reduction unit.

In the traction mode of the rail vehicle 10, as described above, electrical energy flows from the power supply 24 through the transformer unit 26 and the power supply unit 22—that is to say in particular the first current converter unit 28—and the DC link 30 and the current converter units 32 to the traction motors 20, which convert some of the electrical energy concerned into kinetic energy.

In a braking mode of the rail vehicle 10, there is an energy flow in the reverse direction, from the traction motors 20 at least partly through the power supply unit 22 and the transformer unit 26 to the power supply 24. In this braking mode, the traction motors 20 form a generator unit 34 of an energy conversion device 36 that converts the kinetic and where applicable potential energy of the rail vehicle 10 into another form of energy. The generator unit 34 generates electrical energy from this energy in known manner.

In certain application situations, in which the feeding of energy to the power supply 24 is to be restricted or is not even possible, or in which this feeding is not sufficient to generate a setpoint braking moment—as in particular in the case of emergency braking at high speed—the electrical energy generated by the generator unit 34 is diverted away from being fed back to the power supply 24. For this purpose, the energy conversion device 36 has an energy diverting unit 38.

The energy diverting unit 38 has a resistor unit 40 that is provided for the purpose of establishing a certain resistance value in the flow of electrical energy to be diverted. It has two resistance arrangements R1, R2 that each take the form of an ohmic resistor. Because the resistor unit 40 is utilized in the braking mode of the rail vehicle 10, the resistor unit 40 corresponds to a braking resistor unit. The resistor unit 40 is connected to the current converter units 32.1, 32.3 such that energy generated by the traction motors 20 and carried by them may be fed to the resistance arrangements R1, R2. This is illustrated in the figure by heavy arrows. In the braking mode, the current converter units 32.1, 32.2 are accordingly arranged in the energy flow between the traction motors 20—and hence the generator unit 34—and the resistor unit 40. In other words, the current converter units 32.1, 32.2 are each connected to the generator unit 38 on one side and the resistor unit 40 on the other for the provision of power. In particular, the resistor unit 40 is connected up to the DC link 30, which is fed by the current converter units 32.1, 32.2 in the braking mode. The resistor unit 40 is connected between the positive busbar and the negative busbar of the DC link 30.

The energy diverting unit 38 moreover includes a control unit 44 that is provided for selectively setting a first operating mode in which the resistor unit 40 provides a first resistance value, or a second operating mode in which the resistor unit 40 provides a second resistance value.

For this purpose, the resistor unit 40 has a switching device 46 that may be actuated by the control unit 44 for selecting the first or the second operating mode. This switching device 46 serves to selectively disconnect or connect the first and/or the second resistance arrangement R1, R2 from or to the energy flow generated by the generator unit 34. It has two switching arrangements 48.a, 48.b that are respectively associated with a different resistance arrangement R1 or R2. In particular, the switching arrangements 48.a, 48.b may be actuated independently of one another.

In the first operating mode of the energy diverting unit 38, the first resistance value is provided in that one of the resistance arrangements R1, R2 is connected to the generator unit 34 such that power is provided. This connection is made by closing the switching arrangement 48.a or 48.b. In the second operating mode, the second resistance value is provided in that both resistance arrangements R1, R2, in particular connected to one another in parallel, are connected to the generator unit 34 such that power is provided. This is done by connecting up the resistance arrangement R2 or R1, by closing the switching arrangement 48.b or 48.a. If the resistance values of the resistance arrangements R1, R2 are identical, by connecting them in parallel it is possible to provide in the second operating mode a resistance value of the resistor unit 40 that is half the resistance value in the first operating mode.

Figure 3:
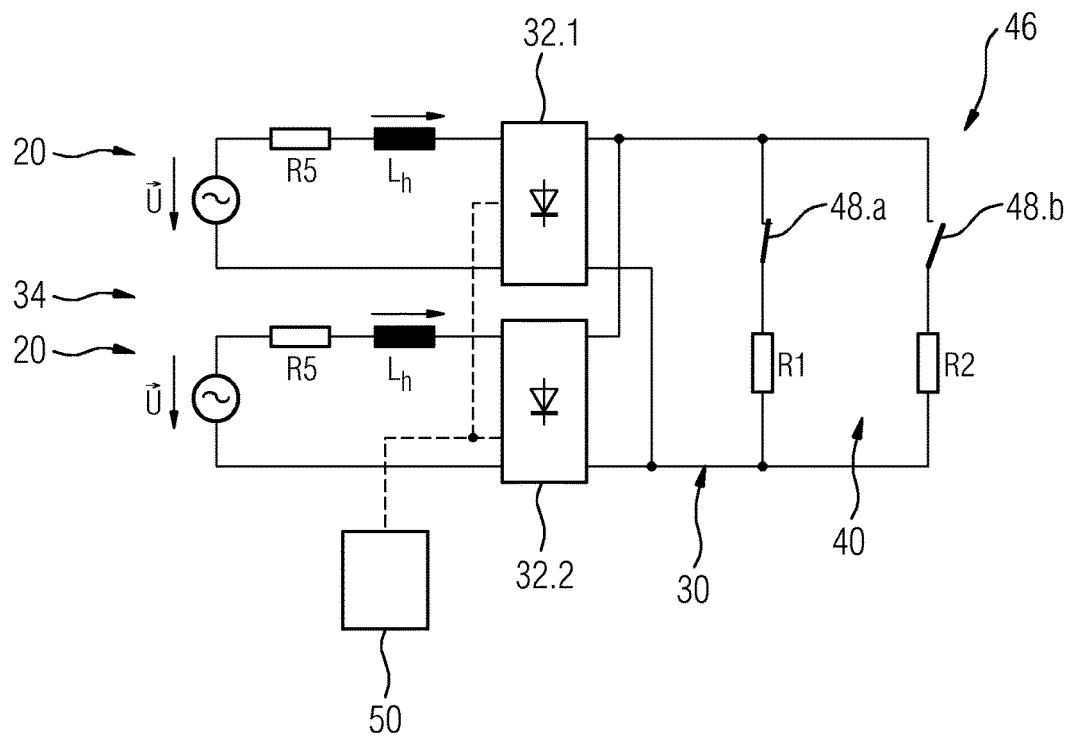
FIG. 3 shows the diversion of energy generated on braking to a resistor unit of the power supply unit.

In the operating modes described above, an alternating electrical current that is generated by a traction motor 20 is carried via the associated current converter unit 32 in a blocking mode of this current converter unit 32. In this blocking mode, the switching valves—in particular power transistors, such as IGBTs—of the current converter unit 32 are permanently in a blocked condition, with the result that the electrical current is carried exclusively via freewheeling diodes that are connected in parallel with the switching valves. As illustrated in FIG. 3, the current converter unit 32 thus takes the form of a diode bridge (also called a "B6 bridge") that rectifies the electrical current. FIG. 3 illustrates, in an equivalent circuit diagram, the traction motors 20 as the voltage source, having an equivalent resistance and an equivalent inductance. The switching valves are put into the blocking condition by a control device 50 that is illustrated schematically in FIG. 3.

Switching between the first operating mode and the second operating mode, that is to say in particular connecting up the second resistance arrangement R2 or R1 in parallel with the first resistance arrangement R1 or R2, is performed in dependence on a kinematic parameter K of the rail vehicle 10. In the embodiment shown here, the switching device 46 is controlled on the basis of a parameter that depends on the vehicle velocity V. This parameter K corresponds in particular to a speed of rotation of a wheelset or a component of the drive unit 14 that is coupled to the wheelset for driving. This may be the speed of rotation of a wheel, the shaft of the wheelset, or a gear component or motor shaft coupled thereto for driving. For this purpose, the rail vehicle 10 has a detection unit 52 for detecting the parameter K that has sensors for the speed of rotation (illustrated highly schematically in FIG. 2). The detection unit 52 is in operative connection with the control unit 44, which serves to evaluate detected measurement values. The parameter K may as an alternative or in addition be obtained using further sensor arrangements, such as an inertial sensor or a positioning unit such as a GPS sensor.

The switching device 46 is actuated by the control unit 44 if it is determined from the monitored parameter K that, during a braking procedure starting from an initial velocity, in particular the maximum permitted velocity, the rail vehicle 10 reaches a pre-selected velocity threshold value GSW.

Figure 4:
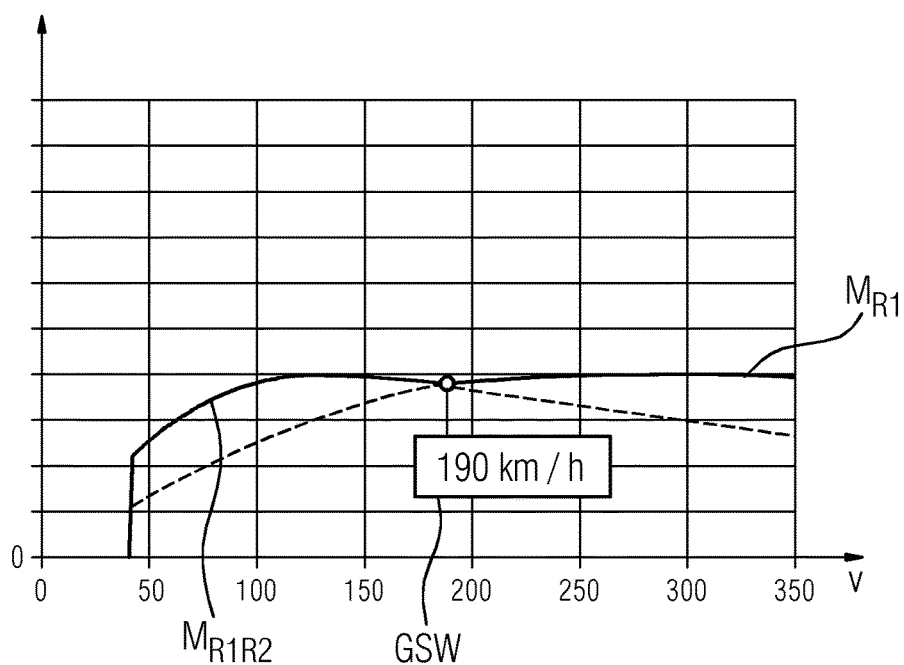
FIG. 4 shows the braking moment that is generated by the drive unit during energy diversion for a drive axle, as a function of velocity.

This is explained in more detail with reference to FIG. 4. This corresponds to a graph in which the braking moment M for each drive axle 16 is illustrated as a function of the vehicle velocity V. When a braking procedure is initiated above the threshold value GSW=190 km/h, in particular at the maximum permitted velocity of 350 km/h, the switching valves of the current converter units 32 are put in the blocking condition as described above, wherein some of the current generated by the traction motors flows into the resistor unit 40, for example as illustrated in FIG. 3 into the first resistance arrangement R1. The braking moment M in the range between the maximum permitted velocity and the threshold value GSW has an almost constant value. The course of the braking moment M for this resistance value R=R1 in the first operating mode is shown by the curve $M_{R1}$. To prevent the braking moment M from falling below this value, when the velocity threshold value GSW is reached the switching device 46 is actuated by the control unit 44. On switching over to the second operating mode, that is to say on connecting up the resistance arrangement R2, the resistor unit 40 has a resistance value R=1/(1/R1+1/R2). The course of the braking moment M for seen from the figure, the braking moment M can be maintained at the previous value during further braking, at least for a certain range of velocities from approximately 100 km/h.

Figure 5:
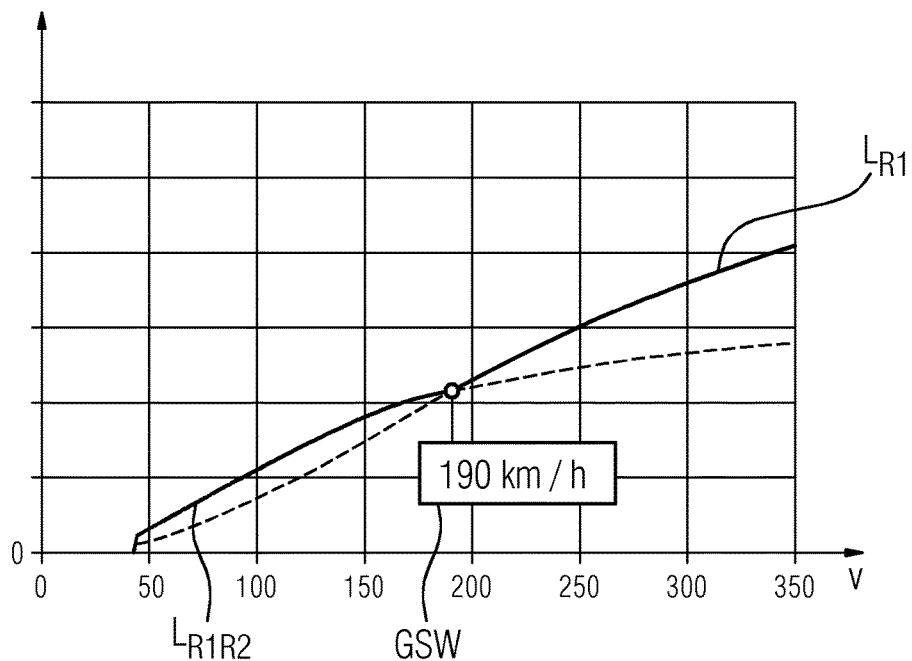
FIG. 5 shows the braking performance generated during energy diversion for a drive axle.

FIG. 5 shows a graph in which the braking performance L is illustrated as a function of the velocity V. The curve $L_{R1}$ corresponds to the course of the braking performance L for the resistance value R=R1 in the first operating mode. On the switchover to the second operating mode described above, it is possible to achieve an increase in the braking performance below the velocity threshold value GSW, following the curve $L_{R1R2}$ for the resistance value R=1/(1/R1+1/R2), by comparison with the configuration in which R=R1.

Moreover, it is advantageous if in the first operating mode, in which only one of the resistance arrangements R1, R2 is active, switchovers between the resistance arrangements R1 and R2 are performed. These switchovers effected by the switching device 46 serve to lessen the thermal load on the resistance arrangements. They are performed periodically or on the basis of the determined load conditions on the resistance arrangements. These may for example be determined by detecting the temperature of the resistance arrangements.

The description above refers to an embodiment in which the plurality of operating modes comprises two operating modes. In a variant embodiment, it is conceivable for more than two operating modes to be implemented. For this purpose, the resistor unit may have more than two resistance arrangements.

The invention claimed is:

1. An energy conversion device for a vehicle, the energy conversion device comprising:
    a unit, operable in at least one mode as a generator unit for generating electrical energy and having at least one synchronous machine;
    at least one energy diverting unit for diverting at least some of the electrical energy generated by said generator unit;
    a detecting unit for detecting at least one kinematic parameter of the vehicle; and
    at least one resistor unit;
    said energy diverting unit having at least one control unit configured for selecting operating modes from a plurality of operating modes in dependence on the kinematic parameter detected by said detecting unit, wherein in each of the plurality of operating modes said at least one resistor unit provides a different resistance value.

2. The energy conversion device according to claim 1, wherein the kinematic parameter represents a velocity of the vehicle.

3. The energy conversion device according to claim 2, wherein said control unit is configured for switching over from a first operating mode to a second operating mode, in an event of a transition from a high-speed range to a medium-speed range, for reducing the resistance value.

4. The energy conversion device according to claim 1, which comprises a power supply unit containing said resistor unit and configured to, in a drive mode, supply electrical power to said unit having said at least one synchronous machine.

5. The energy conversion device according to claim 1, which comprises at least one current converter unit connected to provide power between said generator unit and said resistor unit, wherein said resistor unit is connected up to a DC link to be fed from said at least one current converter unit.

6. The energy conversion device according to claim 5, which comprises a control device for controlling said at least one current converter unit such that operation thereof in the operating modes includes a blocking of switching valves of said current converter unit.

7. The energy conversion device according to claim 1, wherein said resistor unit comprises a set of resistance devices and at least one switching device in operative connection with at least one of said resistance devices, and wherein a switchover between the operating modes includes at least one actuation of said switching device.

8. The energy conversion device according to claim 7, wherein said control unit is configured, using said switching device when selecting an operating mode from the plurality of operating modes, to selectively activate or deactivate a parallel circuit of resistance devices of said set.

9. The energy conversion device according to claim 7, wherein said control unit is configured for activating a first and a second resistance device alternately, in at least one operating mode of the plurality of operating modes, by using said switching device.

10. The energy conversion device according to claim 1, configured for incorporation in a rail vehicle.

11. A vehicle, comprising:
    at least one synchronous machine for driving the vehicle in a traction mode and being operable as a generator unit for generating electrical energy in a braking mode;
    an energy diverting unit for diverting at least some of the electrical energy generated by said synchronous machine in the braking mode, said energy diverting unit including:
    a detecting unit for detecting at least one kinematic parameter of the vehicle;
    at least one resistor unit; and
    a control unit configured for selecting operating modes from a plurality of operating modes in dependence on the kinematic parameter detected by said detecting unit, wherein in each of the plurality of operating modes said at least one resistor unit provides a different resistance value.

12. The vehicle according to claim 11, being a rail vehicle.

13. The vehicle according to claim 11, being a rail vehicle configured for high-speed operation over at least 300 km/h.

14. The vehicle according to claim 11, being a rail vehicle configured for high-speed operation over 350 km/h.

15. A method of converting electrical energy, the method comprising:

generating electrical energy in at least one operating mode of a unit that has at least one synchronous machine and operates as a generator unit;

diverting at least some of the electrical energy thus generated via an energy diverting unit, wherein the energy diverting unit has at least one resistor unit;

detecting at least one kinematic parameter of the vehicle with a detecting unit;

switching over, with a control unit of the energy diverting unit, from a first operating mode, in which the resistor unit provides a first resistance value, to a second operating mode, in which the resistor unit provides a second resistance value different from the first resistance value, in dependence on the at least one kinematic parameter detected by the detecting unit.

16. The method according to claim 15, which comprises carrying out the method steps in a vehicle.

17. The method according to claim 16, which comprises carrying out the method steps in a rail vehicle.

18. The method according to claim 16, which comprises, in an event of a transition from a high-speed range to a medium-speed range of the vehicle, selecting the second resistance value to be smaller than the first resistance value.

* * * * *